(12) United States Patent
Youn (10) Patent No.: US 7,501,947 B2
(45) Date of Patent: Mar. 10, 2009

(54) RFID TAG WITH SMALL APERTURE ANTENNA

(75) Inventor: Tai Won Youn, Albuquerque, NM (US)

(73) Assignee: TC License, Ltd., Hummelstown, PA (US)

( * ) Notice: Subject to any disclaimer, the term of this patent is extended or adjusted under 35 U.S.C. 154(b) by 149 days.

(21) Appl. No.: 11/121,140

(22) Filed: May 4, 2005

(65) Prior Publication Data

US 2006/0250250 A1    Nov. 9, 2006

(51) Int. Cl.
*G08B 13/14* (2006.01)
(52) U.S. Cl. .................................. 340/572.1
(58) Field of Classification Search .............. 340/572.7, 340/572.1, 928, 10.1, 825.69; 343/711, 789, 343/860; 705/13
See application file for complete search history.

(56) References Cited

U.S. PATENT DOCUMENTS

| | | | | |
|---|---|---|---|---|
| 4,075,632 | A | 2/1978 | Baldwin | 343/6.8 R |
| 4,114,601 | A * | 9/1978 | Abels | 600/20 |
| 4,739,328 | A | 4/1988 | Koelle | 342/44 |
| 4,782,345 | A | 11/1988 | Landt | 343/727 |
| 4,786,907 | A | 11/1988 | Koelle | 342/51 |
| 4,816,839 | A | 3/1989 | Landt | 343/795 |
| 4,853,705 | A | 8/1989 | Landt | 343/803 |
| 5,432,518 | A | 7/1995 | Van Erven | 342/42 |
| 5,528,222 | A | 6/1996 | Moskowitz | 340/572 |
| 5,606,323 | A | 2/1997 | Heinrich | 342/51 |
| 5,682,143 | A | 10/1997 | Brady | 340/572 |
| 5,786,626 | A | 7/1998 | Brady | 257/673 |
| 5,826,328 | A | 10/1998 | Brady | 29/827 |
| 5,847,682 | A | 12/1998 | Ke | 343/752 |
| 5,914,692 | A | 6/1999 | Bowers | 343/742 |
| 5,972,156 | A | 10/1999 | Brady | 156/280 |
| 5,995,006 | A | 11/1999 | Walsh | 340/572.7 |

(Continued)

OTHER PUBLICATIONS

Harry Stockman, "Communication by Means of Reflected Power," Proceedings of the I.R.E., Oct. 1948, pp. 1196-1204.

(Continued)

*Primary Examiner*—Phung Nguyen
(74) *Attorney, Agent, or Firm*—Caesar, Rivise, Bernstein, Cohen & Pokotilow, Ltd.

(57) ABSTRACT

A RFID tag to be attached to an object to identify the object or a characteristic or feature thereof from data stored in the tag accessible by a RFID reader includes a relatively flat structure having a small aperture antenna positioned on or proximate the tag in the form of a polygon having electrically conductive sides. The flat structure, which may be fabricated as a sticker or label, incorporates a small aperture antenna, such as a slot antenna, in the form of a polygon having electrically conductive sides. The polygon may be triangular, rectangular, square, elliptical, circular, or other polygonal figure depending on number of its plurality of sides. A constitutes the aperture of the antenna. An integrated circuit chip containing the electronics of the tag is secured to the flat structure within the boundary of the aperture constituting the central open portion within the polygon, and substantially equidistant from a pair of opposite sides of the polygon, with a pair of conductive impedance matching elements of substantially equal length confronting each other in the aperture from the opposite sides. Methods of use are disclosed.

42 Claims, 7 Drawing Sheets

U.S. PATENT DOCUMENTS

| | | | | |
|---|---|---|---|---|
| 6,018,299 A * | 1/2000 | Eberhardt | 340/572.7 |
| 6,028,564 A | 2/2000 | Duan | 343/818 |
| 6,078,259 A | 6/2000 | Brady | 340/572.7 |
| 6,097,347 A | 8/2000 | Duan | 343/802 |
| 6,118,379 A | 9/2000 | Kodukula | 340/572.8 |
| 6,121,880 A | 9/2000 | Scott | 340/572.5 |
| 6,140,146 A | 10/2000 | Brady | 438/62 |
| 6,147,606 A | 11/2000 | Duan | 340/572.7 |
| 6,147,655 A | 11/2000 | Roesner | 343/741 |
| 6,215,402 B1 | 4/2001 | Kodukula | 340/572.8 |
| 6,259,408 B1 | 7/2001 | Brady | 343/700 |
| 6,275,157 B1 | 8/2001 | Mays | 340/572.5 |
| 6,278,413 B1 | 8/2001 | Hugh | 343/818 |
| 6,329,915 B1 | 12/2001 | Brady | 340/572.1 |
| 6,366,260 B1 | 4/2002 | Carrender | 343/866 |
| 6,535,175 B2 | 3/2003 | Brady | 343/795 |
| 6,608,551 B1 | 8/2003 | Anderson | 340/10.51 |
| 6,617,962 B1 | 9/2003 | Horowitz | 340/10.4 |
| 6,646,328 B2 | 11/2003 | Tsai | 257/659 |
| 6,662,430 B2 | 12/2003 | Brady | 79/600 |
| 6,677,917 B2 | 1/2004 | Van Heerden | 343/897 |
| 6,686,830 B1 | 2/2004 | Schirtzer | 340/10.2 |
| 6,696,954 B2 | 2/2004 | Chung | 340/572.7 |
| 6,700,491 B2 | 3/2004 | Shafer | 340/572.7 |
| 6,701,605 B2 | 3/2004 | Huffer | 29/601 |
| 6,703,935 B1 | 3/2004 | Chung | 340/572.7 |
| 6,708,881 B2 | 3/2004 | Hartmann | 235/454 |
| 6,720,930 B2 | 4/2004 | Johnson | 343/742 |
| 6,726,099 B2 | 4/2004 | Becker | 235/380 |
| 6,738,025 B2 | 5/2004 | Carrender | 343/860 |
| 6,809,692 B2 * | 10/2004 | Puente Baliarda et al. | 343/713 |
| 6,814,284 B2 | 11/2004 | Ehlers | 235/388 |
| 6,816,075 B2 | 11/2004 | Grunes | 340/572.1 |
| 6,819,244 B2 | 11/2004 | Dukler | 340/572.1 |
| 6,832,251 B1 | 12/2004 | Gelvin | 709/224 |
| 6,834,251 B1 | 12/2004 | Fletcher | 702/150 |
| 6,835,866 B1 | 12/2004 | Mangelsdorf et al. | 800/18 |
| 6,835,900 B2 | 12/2004 | Jones | 177/145 |
| 6,836,215 B1 | 12/2004 | Laurash | 340/572.1 |
| 6,836,468 B1 | 12/2004 | O'Toole | 370/310 |
| 6,836,472 B2 | 12/2004 | O'Toole | 370/335 |
| 6,837,427 B2 | 1/2005 | Overhultz | 235/382 |
| 6,837,435 B2 | 1/2005 | Kehoe | 235/472.01 |
| 6,837,436 B2 | 1/2005 | Swartz | 235/472.02 |
| 6,837,438 B1 | 1/2005 | Takasugi | 235/492 |
| 7,006,048 B2 * | 2/2006 | Chang | 343/767 |
| 7,154,449 B2 * | 12/2006 | Liu et al. | 343/867 |
| 7,190,319 B2 * | 3/2007 | Forster et al. | 343/806 |
| 7,274,297 B2 * | 9/2007 | Kodukula et al. | 340/572.7 |
| 2003/0006901 A1 | 1/2003 | Kim | 340/572.5 |
| 2003/0058180 A1 | 3/2003 | Forster | 343/767 |
| 2004/0036657 A1 | 2/2004 | Forster | 343/702 |
| 2004/0041739 A1 | 3/2004 | Forster | 343/806 |
| 2004/0083130 A1 * | 4/2004 | Posner et al. | 705/13 |
| 2004/0169604 A1 | 9/2004 | Lee | 343/700 |
| 2004/0201522 A1 | 10/2004 | Forster | 343/700 |
| 2005/0024287 A1 * | 2/2005 | Jo et al. | 343/822 |
| 2005/0093678 A1 * | 5/2005 | Forster et al. | 340/10.1 |
| 2005/0156803 A1 * | 7/2005 | Soler Castany et al. | 343/770 |
| 2005/0179604 A1 * | 8/2005 | Liu et al. | 343/742 |

OTHER PUBLICATIONS

Alfred R. Koelle et al., "Short-Range Radio-Telemetry for Electronic Identification, Using Modulated RF Backscatter," Proceedings of the Institute of Electrical and Electronics Engineers, pp. 1260-1261, Aug. 1975.

R.E. Bobbett et al., "Description of Model 73 Telemetry System for Reporting Temperature and Identification," LA-6410-MS Informal Report, Los Alamos Scientific Laboratory of the University of California, Los Alamos, New Mexico, pp. 1-9, Jul. 1976.

Hewlett-Packard Co., "Designing the Virtual Battery," Application Note 1088, Nov. 1997, pp. 1-8, USA.

Edward C. Jordan et al., "Electromagnetic Waves and Radiating Systems," Second Edition, Prentice-Hall Electrical Engineering Series, pp. 496-519, Prentice-Hall, Inc., Englewood Cliffs, New Jersey, 1968.

Simon Ramo et al., "Fields and Waves in Communication Electronics," pp. 668-671, John Wiley & Sons, Inc., 1967.

Roger F. Harrington, "Time-Harmonic Electromagnetic Fields," McGraw-Hill Book Company, pp. 428-431, 1961.

* cited by examiner

RFID TAG WITH SMALL APERTURE ANTENNA

FIELD OF THE INVENTION

The present invention relates generally to radio frequency identification (RFID) systems and methods of operation, and, more particularly, to antenna designs for enhancing the performance of RFID tags. The present invention may also be used to improve performance of other radio systems with non-conventional and highly reactive loads.

BACKGROUND OF THE INVENTION

In general, RFID systems consist of a tag or multiplicity of tags implemented to provide information such as identity, features, or characteristics of an object to which the tag is affixed, and to transmit that information via an RF signal to a RFID reader in response to an RF interrogation signal received by the tag from the reader. In most instances of supply chain tagging applications the tag is placed on a container (e.g., a carton, a case or a pallet) for a multiplicity of the same items, in contrast to item-level RFID tagging, in which each individual item is given its own RFID tag. The identity of and perhaps other information relating to the tagged article is stored in a memory device of its tag, and is transmitted by the RFID tag to a remote interrogator, or reader, in response to a scan (or query, command or interrogation—these terms, for present purposes, meaning the same thing) from the reader when the reader is within the response range of the tag, i.e., a range suitable for RF communication between reader and tag. Thus, although the term RFID has a connotation of one-way transfer of identification information from an object (the tag) to another location, RFID systems often involve two-way communication.

In its most basic form, the conventional RFID tag consists of a transponder and an antenna. Often, the RFID tag itself is referred to as a transponder. These tags are in use in a variety of applications beyond supply-chain tagging, such as tracking movable assets (e.g., as diverse as rail cars and locomotives to cattle and other animals), non-stop highway toll collection, control of access to everything from secure areas of a facility to entertainment events, vehicle registration, mobile electronic payment of services, and a host of other applications where moderate communication distances and moderate data transfer are required, notwithstanding potentially difficult environments and high speed of tagged objects. These applications require that the RFID tag be small in size.

RFID tags may be either passive or active. A passive RFID tag lacks an internal self-sufficient power supply, e.g., a battery, and relies instead on the incoming RF query by the reader to produce sufficient power in the tag's internal circuitry to enable the tag to transmit a response. In essence, the query induces a small electrical current in the tag's antenna circuitry, which serves as the power source that enables tag operation. A passive tag may have range and function more limited than an active tag.

But the absence of a battery leads to certain advantages, primarily that a passive tag can have virtually unlimited life and be fabricated at much less cost and in considerably smaller size than an active tag, thus serving an important need to improve the efficiency and accuracy of tracking systems for commerce, security and defense. With costs of production trending downward, passive RFID tags could soon replace the ubiquitous universal product code (UPC) for many applications, the bar code strip found on myriad products and product containers in the stream of commerce. Unlike RFID, the imprinted bar code strip requires a line of sight optical scan to produce the UPC readout and the resulting computerized display or printout of price (at a point of sale of the bar-coded product) and other information regarding the product.

The on-board battery of an active RFID tag can give the tag a greater dynamic range than a passive tag, higher data rates and additional functions that require a constant supply of power, but the active tag has the aforementioned disadvantages of limited life and higher cost and size relative to the passive tag. The battery itself may be quite small, but not small enough to overcome the size disadvantage.

The principles of the present invention are applicable to both passive and active RFID tags, but have relatively greater impact for passive tags.

RFID tags may operate as read-only (RO) devices, capable of transmitting only fixed, invariable information stored in the tag memory of the semiconductor integrated circuit (IC) chip in which the tag is fabricated, as the readout when the tag is scanned by the reader in an RF communication between reader and tag. RFID tags may also be readable/writable devices adapted to allow their memories to be read and/or overwritten by a reader during a communication session. Data stored in memory (e.g., electrically-erasable programmable read-only memory, or EEPROM), whether original, overwritten or new, is available for transmittal to the reader on receipt by the read/write RFID tag of an appropriate command. Tag memory may contain a RO portion and a read/write portion.

The form of communication known as modulated backscatter typically used by passive tags is a decades-old technique. Tags that communicate in this way can be very low power, with operational distances as great as tens of meters for radio signals in the ultra high frequency (UHF) or microwave bands.

Passive backscatter tags, or simply passive tags, typically use one or more Schottky diodes to convert the reader's RF signal incident on the tag's antenna into a rectified DC voltage. Often, such diodes are used in a voltage-doubler configuration to boost voltage. However, the impedance of the tag's electronics and Schottky diode power circuit are poorly matched to antenna designs heretofore proposed for RFID tags. Conventional matching techniques have been utilized in an effort to reduce the mismatch as much as possible to tolerable levels (e.g., as described in publications such as Application Note 1008, "Designing the Virtual Battery", Hewlett-Packard Corporation, 1997 (the applicable divested technology group now under the Agilent banner); or U.S. Pat. No. 4,816,839 but they create disadvantages of RFID tag size, cost, capability and efficiency.

Passive RFID tags usually incorporate very simple antenna structures, principally dipoles, loops or patches, in linear or circular polarized designs with impedance matching elements. Typically, the antenna is embedded in or attached to the structure of the tag, and the antenna port has moderate impedance typically on the order of 20 to 300 ohms. In contrast, the impedance of the tag electronics is capacitive, with a typical impedance of 5−j350 ohms.

Multi-turn loop antennas can be used at low RF frequencies (in a range of about 100 kHz (kilohertz) to 13.56 MHz (megahertz)), but resonant-type antennas have enjoyed more common use in the UHF bands in the prior art. The latter include the fan-paddle of the aforementioned '839 patent, dipoles, folded dipoles, dipoles with parasitic elements, arrays of folded dipoles, loops, spirals and patches. The size of a resonant antenna is on the order of a half wavelength or more of the RF frequency at which it is operated. The physical size of antennas generally has been shortened by use of meander lines of various kinds. Antennas such as short dipoles have been used with matching techniques to compensate for the typically large mismatch between the antenna impedance and the load impedance.

Over the past several years, semiconductor technology has progressed to the point at which microwave Schottky diodes can, by use of CMOS (complementary metal oxide silicon) process technology, be integrated into the IC chip along with the other component circuitry of the tag's electronics. Thus, a RFID tag operating at UHF frequencies can be constructed as a single IC chip (i.e., as a radio frequency IC, or RFIC, or application-specific IC, or ASIC) together with an antenna on the same substrate. Such tags have been previously available for operation at low RF frequencies, typically at or below 13.56 MHz.

More recently, other options have been made possible for tag antennas through advances in process technology that have produced further reduction in chip size including the size of RFICs and ASICs. But antennas and impedance matching techniques heretofore proposed for passive RFID tags remain burdened by limitations on size, efficiency, cost, bandwidth, and sensitivity to nearby objects such as the surface on which the tag is mounted.

A typical conventional RFID tag reader employs a transceiver, a control unit and an antenna for communicating with (e.g., interrogating) the tag at one or more designated RF frequencies among several allocated for this purpose. U.S. Federal Communications Commission (FCC) radio regulations specify frequency and power permissible for RFID reader operation in the United States. Regulatory agencies in other countries have their own restrictions for radio communications. Consequently, the efficiency of a passive backscatter RFID tag in converting RF signals incident on the antenna from the reader to DC power for the tag's backscatter response, is of considerable importance to the operation and use of such devices.

In the specific case of a RFID system consisting of a reader (interrogator) and a tag (transponder) used to complete transactions in high speed applications such as toll collection transactions by identification of authorized vehicles passing the reader in designated lane(s) at highway speed, the system configuration poses serious engineering challenges. The RFID tag should be thin, small, of straight forward design and therefore relatively easy to manufacture, low cost, and high performance, capable of use in potentially hostile (or at least unfriendly) operating environments where the tag may be subject to extremes of vibration, chemicals, dust, temperature and humidity and other atmospheric or ambient conditions. While the utility and use of the present invention is explained in terms of an electronic toll collection, the present invention is also of great use in all other applications of RFID as well as use in systems containing fixed and handheld readers.

The design of RFID tags requires matching the antenna impedance and load impedance, usually by a matching circuit, for maximizing the RF power from the reader's interrogation or command signal received at the tag antenna to be delivered to the RFIC with minimum loss, and thereby achieve optimum tag sensitivity. The custom integrated circuit of which the RFIC is comprised may include the voltage-doubler, analog and digital circuitry of the transponder, and memory capacity to store the software programming and data to be transmitted to the reader in response to a command, as well as other electronics as may be necessary for a particular RFID design.

Theoretically, maximum power delivery is achieved by conjugate impedance matching, which demands that the impedance from the antenna be, as closely as possible, the mathematical conjugate of the RFIC input impedance. This represents an ideal impedance match.

Figure 1:
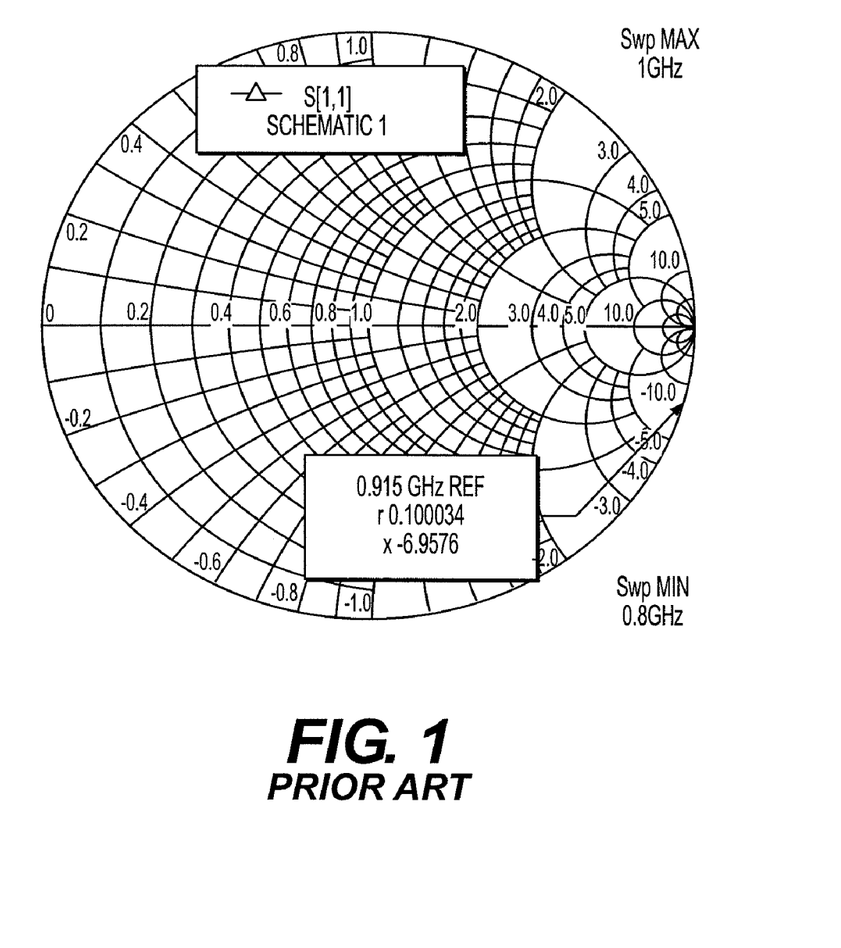
FIG. 1 is a Smith chart of a typical RFIC input impedance in a RFID tag of the prior art, discussed in the Background section, above.

The typical RFIC input impedance is generally a complex impedance of $Z=5-j350$ ohms, which can be normalized to $Z=0.1-j6.9$ ohms (where j is the imaginary portion of the complex impedance Z) for a 50-ohm system typical of the antenna port, as shown in the RFIC input impedance diagram (Smith chart) of FIG. 1.

Figure 2:
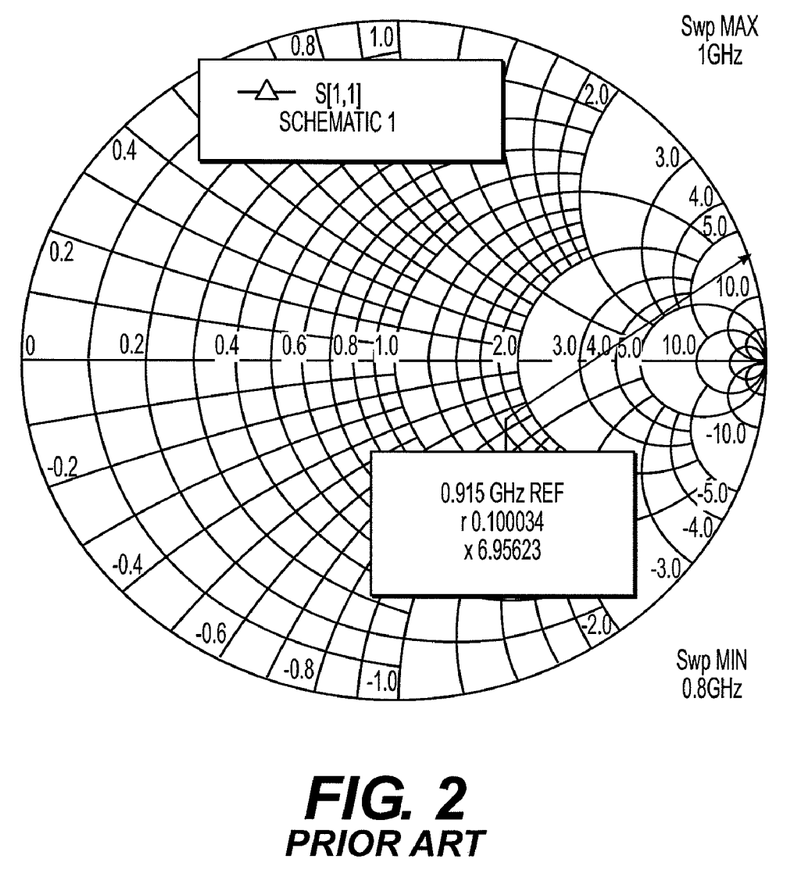
FIG. 2 is a Smith chart of a typical impedance from the antenna in a RFID tag of the prior art, idealized as the conjugate impedance match of the RFIC input impedance of FIG. 1, also discussed in the Background section, above.

For maximum power transfer through the conjugate impedance match, the impedance from the antenna should be close to $Z=5+j350$ ohms, which can be normalized to $Z=0.1+j6.9$ ohms for the 50-ohm system, as shown in the Smith chart of FIG. 2, representing the impedance from the antenna.

Figure 3:
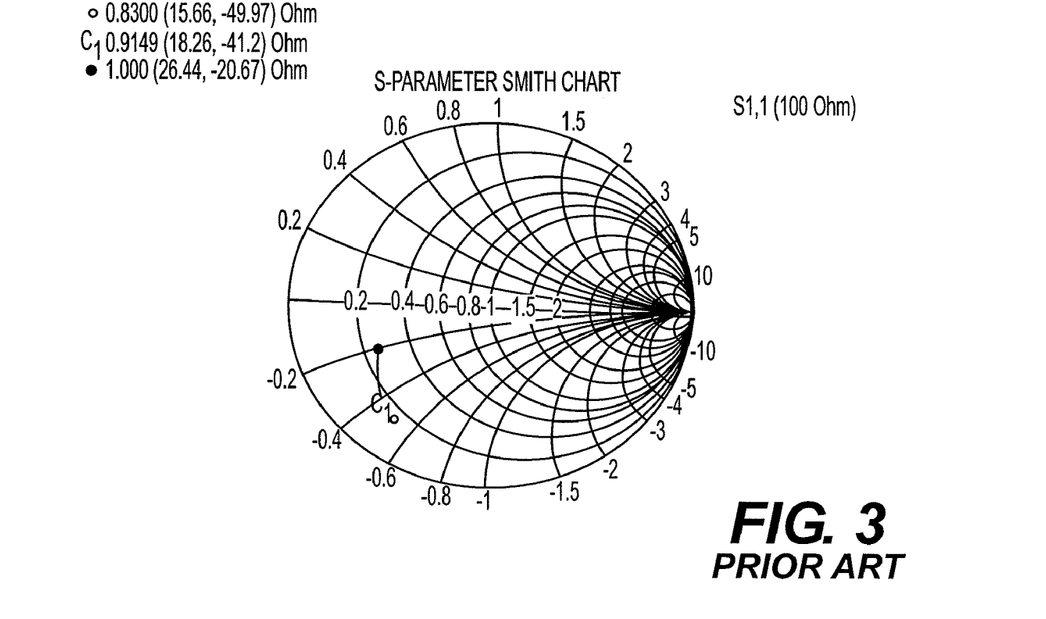
FIG. 3 is a Smith chart of impedance from a dipole antenna in a typical RFID tag of the prior art, also discussed above.
Figure 4:
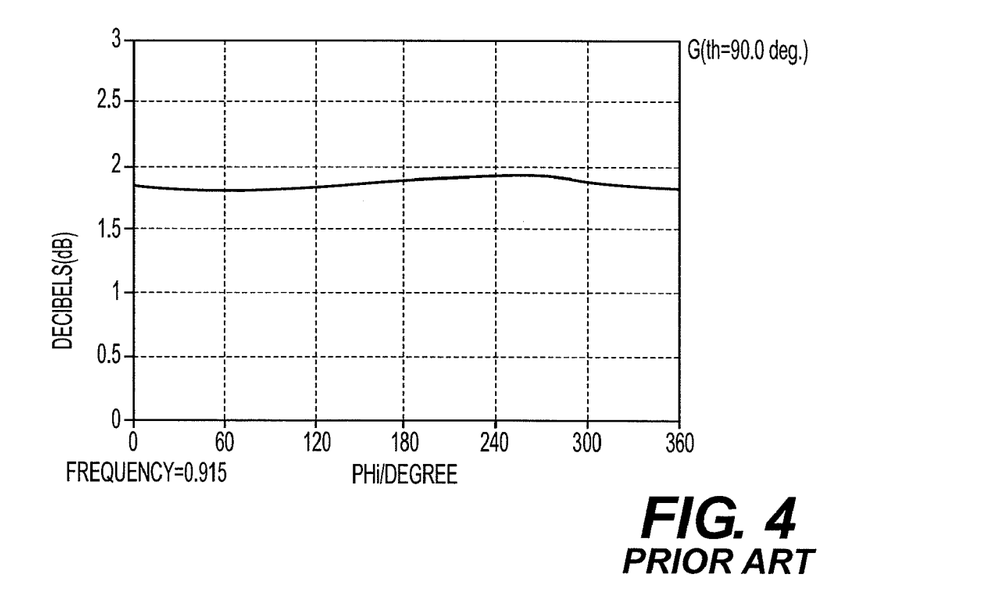
FIG. 4 is a chart illustrating the gain of the typical dipole antenna of FIG. 3 from 0 through 360 degrees, as discussed above.

FIG. 3 is a Smith chart of the dipole antenna impedance in a typical prior art RFID tag. The antenna impedance, for example, is $Z=18-j41$ ohms at 915 MHz. And as illustrated by the chart of FIG. 4, a dipole antenna with the Smith chart of FIG. 3 exhibits a relatively constant gain of about 1.8 dB (decibels) from 0 through 360 degrees.

A significant problem encountered in seeking to use prior art RFID tags in high speed applications, such as highway on-the-fly (vehicle non-stop) toll collection systems is the degree of difficulty encountered to design an antenna and impedance matching circuit of reasonably practical size, to optimize the RF communications performance of the tag.

A resonant antenna, such as the dipole antenna that has been the antenna of choice for RFID tags, has an optimum size at about a half-wavelength of the designated RF frequency for communications between RFID reader and tag. For example, if the designated RF frequency is 915 MHz, which is typical for RFID communications, one-half wavelength is about 164 mm (millimeters). The impedance matching circuit of a dipole antenna, as well as other antenna designs used in RFID tags of previous design, has a relatively small shunt inductive impedance and large series inductive impedance. These attributes create a prodigious, virtually impossible task to design an impedance matching circuit of practical size and high energy efficiency for a dipole antenna or other antenna design heretofore proposed for use in a RFID tag.

Generally for antenna designs, the series-matching component may be easy to implement, while the shunt matching component is very difficult to implement because the circuit ground required for the shunt component is normally not well defined and not readily available without degrading antenna performance or necessitating an impractical antenna design.

SUMMARY OF THE INVENTION

It is a principal object of the present invention to provide improvements in the design of antenna and impedance matching circuitry for a RFID tag.

Another principal aim of the invention is to provide a RFID tag antenna with impedance matching circuitry of substantially smaller overall physical dimensions than have heretofore been attainable.

A related, more specific object of the invention is to provide a RFID tag of extremely compact size and thinness, in the form of a sticker to be adhesively applied to an object whose identity, features, characteristics, authorized use or other aspects are discernible from data stored in tag memory accessible by a RFID reader, and which is adapted to communicate with the reader through a tag antenna of small aperture design, such as a slot antenna, and of polygonal shape with central aperture.

Other objects include increasing efficiency of antenna and matching elements of the RFID tag to reduce incident RF power requirements and increase operational range of the tag; obtaining wider bandwidth operation of the tag, by some 10% to 20% over current bandwidths; enabling self-adhesion of the tag in highly compact form to the windshield or other surface of a roadway or railway vehicle, with electrical components of the tag designed and positioned for optimum performance of the tag in communication sessions with a RFID reader; incorporating low-cost DC block at the antenna feed terminals to be compatible with a voltage-doubler constructed with Schottky diodes whether external or internal to an integrated circuit (IC) chip of the tag; reducing variability of performance of the tag when mounted on objects with different electrical properties; and rendering the tag capable of use in extremes of vibration, chemicals, dust, temperature and humidity and other adverse atmospheric or ambient conditions.

A preferred embodiment of the present invention is described herein in the form of a thin sticker tag for electronic toll collection applications. The invention may also be used for other applications and using other construction techniques. The tag may be constructed on a conventional printed circuit board, fabricated on paper or cardboard, mounted inside a case, encapsulated in plastic, bonded by adhesive application on the inner surface of a windshield glass, and using other methods.

According to the most preferred embodiment of the invention, a RFID tag includes a flat, or planar, structure (i.e., relatively smooth with its major surfaces essentially parallel and distinctly greater than its minor surfaces) for adhesive application to the surface of an object to identify the object or a characteristic or feature thereof from data stored in the tag accessible by a RFID reader. The flat structure may be a sticker that incorporates a small aperture antenna, such as a slot antenna, in the form of a polygon having electrically conductive sides. The polygon may be square, rectangular, or in the limit of multiple sides, circular or elliptical, or some other polygonal figure. A central open portion within the polygon constitutes the aperture of the antenna. An integrated circuit chip containing the electronics of the tag is secured to the flat structure within the boundary of the aperture, substantially equidistant from a pair of opposite sides of the polygon, with a pair of conductive impedance matching elements of substantially equal length extending toward each other into the aperture from those opposite sides for minimizing losses in communication between antenna and chip.

A feeding point for the antenna is located between the impedance matching and antenna elements. In a presently preferred embodiment, the polygonal antenna is formed in a planar, electrically conductive layer of the tag, and each of the pair of impedance matching elements is an electrically conductive strip of that layer. The conductive layer forming the polygon and the pair of impedance matching elements may be an etched metal layer overlying an electrically insulative sheet of the flat structure; or it may be a conductive ink imprinted on an electrically insulative sheet of the flat structure.

The impedance matching circuit further includes a second pair of elements constituting a mirror image of the first pair of elements, with the respective pairs overlying opposite sides of the electrically insulative sheet, such that the polygon and first pair of elements overlie one side of the sheet and the IC chip and second pair of elements overlie the other side of the sheet. Preferably, the first and second pairs of elements are electrically coupled through the capacitance formed by dielectric of the sheet. Alternatively, they may be electrically connected by a conductive path through the sheet such as by opening a hole between matching elements on both sides of the sheet and filling the hole with metal.

Since RFID tags are required to operate over a band of frequencies, ideally, an impedance match would be required at each and every frequency over a band of frequencies. Optimum (maximum) power delivery to the load is obtained with a conjugate match, and optimum over a band of frequencies requires a match at each and every frequency in the band. A practical implementation strives to obtain a match as closely as practicable.

Also, the antenna aperture should not vary appreciably over the frequency band. Maximum power deliverable is equal to the product of the incident power density and antenna aperture. The load is capacitive:

$$5-j320=5-j \, Xant=5-j \, 1/(2 \, pi \, f \, C),$$

where Xant is the reactive (capacitive) component of the impedance of the load that is the ASIC or RFIC in this embodiment of the invention, f is the frequency, and C is the capacitance and is fixed. Thus, as f goes up, Xant goes down.

The desire is for an antenna and matching impedance that compensates, that is:

$$Zam=Ram+j \, Xam,$$

where Zam is the complex impedance at the ASIC input looking into the antenna matching circuit including the matching circuit and the antenna; Ram is the resistive component of Zam; and Xam is the reactive (in the prior art systems, inductive) component of Zam. The desire is that Xam goes down as f goes up. But Xam is positive (inductive). The reactance of an inductor is 2 pi L, where L is the inductance and is fixed. So Xam goes up as the frequency goes up, which is in the wrong direction. Hence, the bandwidth of the prior art RFID tags has limited bandwidth because of this kind of response.

The RFID tag of the present invention overcomes this type of response. Specifically, the reactance of the antenna with matching impedance circuit behaves not as an inductor as the frequency is varied, but rather, as a capacitor, and thus achieves a better match over a band of frequencies. The antenna aperture (or equivalently, gain) is less influenced by frequency and nearby metallic or dielectric objects than other types of antennas.

Thus, it will be observed that the combination of the small aperture antenna with matching elements of the invention is, itself, a significant improvement over combinations involving antenna and matching elements of the prior art. This combination according to the present invention is capable of optimizing power delivery to a non-conventional, highly reactive load, which may be but is not necessarily a capacitive load, and over a wide bandwidth (band of frequencies). The antenna with matching elements of the invention is especially suitable for use in a RFID tag, and for use with a voltage doubler.

Accordingly, it is still another principal object of the invention to provide an improved combination of antenna with matching elements for optimizing power delivery in applications where a highly reactive load is present.

Preferably, the flat structure of the tag and its components are encompassed within a coating, such as a lamination, for protection against damage from ambient environment, and also, with an adhesive side exposed to allow the sticker to be adhesively applied to the object of interest.

The RFID tag is preferably but not necessarily of the passive type. The small aperture antenna is of a size considerably smaller than a half wavelength of the nominal RF frequency at which the tag is to operate. The antenna's small size and the impedance matching circuit's relatively large shunt impedance (which is considered practically an open circuit with very high impedance, i.e., on the order of 1500 ohms) and relatively small series impedance are significant factors in enabling the RFID tag of the invention to be fabricated in the form of a very thin, extremely compact sticker. Thus, the tag is suitable for self-adhesion to the windshield or other structural component of a vehicle for use in moderate to high speed applications, such as on-the-fly highway toll collection systems and moving rail car asset identification systems. Examples of use of the RFID tag of the invention in other vehicle applications include access to parking spaces in gated parking facilities, electronic vehicle registration stickers, in gated secure facilities and in any application where remote identification of a vehicle is required.

The small aperture antenna used in a RFID tag according to the invention may be fabricated in a size as small as within the range from about 30 to 70 mm for operation in the 915 MHz band, and have far less energy dissipation in the series inductive impedance component of the impedance matching circuit, compared to a RFID tag with a dipole antenna. These advantages contribute to a much higher performance capability for RF communication by and with the tag, compared to a dipole (or other types such as loops and patches)-equipped RFID tag. The antenna should be sized to allow a sticker-type tag (or really, any RFID tag) to be of a size suitable for application to a windshield without substantial coverage of the glass. A slot antenna can be sized much smaller than a half wave length of its RF frequency (e.g., in a range from 30-70 mm), so its aperture would be even considerably smaller than one-half wavelength. In the context of the invention, the term "small" in relation to usage in a RFID tag refers to antenna aperture size substantially less than a half-wavelength of its designated RF communication band. The antenna aperture is preferably small in size compared to conventional resonant antennas for RFID tags.

For a highway high speed toll collection application, the IC containing much if not all the electronic circuitry of the tag, the small aperture antenna in its polygonal shape, and the impedance-matching circuit of the aforementioned related conductive strip design are packaged together in a thin sticker to be adhered to an object of interest, such as a vehicle. The sticker is adapted for adhesion to the windshield of the vehicle, and the vehicle with the sticker affixed thereto is an indicia of authority granted by a government entity, such as the state highway department, to participate in an on-the-fly roadway toll collection system in which at least one RFID reader is positioned for RF communication with the tag in a toll collection lane of the roadway to acquire authorization data stored in the tag's memory, with each passage of the vehicle through the toll collection lane.

Another aspect of the invention resides in a method of enabling a vehicle to be detected automatically as being authorized for passage through a restricted lane equipped with a RFID reader, including the step of making available to the vehicle a RFID tag in the form of a planar compact sticker that incorporates a storage medium programmed with authorization data that identifies the vehicle as being permitted to pass through the restricted lane without stopping. The sticker includes a small aperture antenna implemented as a polygon with central aperture for optimized communication of the stored authorization data from the antenna in a backscatter RF signal in response to an interrogating RF signal from the RFID reader within RF communication range of the tag.

Applications other than those already mentioned above in this summary, or referred to in the subsequent detailed description, include situations where the restricted lane is a payment collection lane for automatic debiting of payment due with each passage of the vehicle therethrough, such as an automated parking garage operated in conjunction with a facility where lessees or their employees enjoy special membership arrangements; or where the restricted lane is a track of a railway system for asset tracking by RFID tag identification of each passage of a tagged railcar on the track past the RFID reader.

Other applications of the invention reside in usage in virtually any environment where an object to be identified in terms of its characteristics, right of access, location, contents, and other features or aspects, is typically traveling at moderate to high speed over a surface relative to the position of a reader, which may also be moving or may be fixed, within RF communication range of the passing object. For example, in the aforementioned railcar asset identification system or method, where the tag operates in conjunction with the small aperture antenna and is attached to a rail car whose ownership, asset or accounting designation, movements, contents, current location, heading and so forth are to be identified. Alternatively, a RFID tag constructed or used according to the principles of the invention, may be secured to an object that is typically operated or transported at slow speeds, or is often or always motionless.

Regardless, a significant aspect of the invention is a RFID tag that utilizes a small aperture antenna implemented in a polygonal form with centralized aperture, and impedance matching elements integral with a pair of opposite sides of the polygon for coupling to the tag's IC chip. Another highly significant aspect of the invention is the combination of small aperture antenna with matching elements having a capability of optimizing power delivery to a highly reactive load.

BRIEF DESCRIPTION OF THE DRAWINGS

The above and other aims, objectives, aspects, features and advantages of the invention will be better understood from a consideration of the following detailed description of the best mode contemplated for practicing the invention, taken with reference to certain preferred embodiments and methods, and the accompanying drawings in which.

DETAILED DESCRIPTION OF PRESENTLY CONTEMPLATED BEST MODE OF PRACTICING THE INVENTION

In describing a preferred embodiment of the invention illustrated in the drawings, certain specific terminology will be used for the sake of clarity. However, the invention is not intended to be limited to that specific terminology, and it is to be understood that the terminology includes all technical equivalents that operate in a similar manner to accomplish the same or similar result.

Figure 5A:
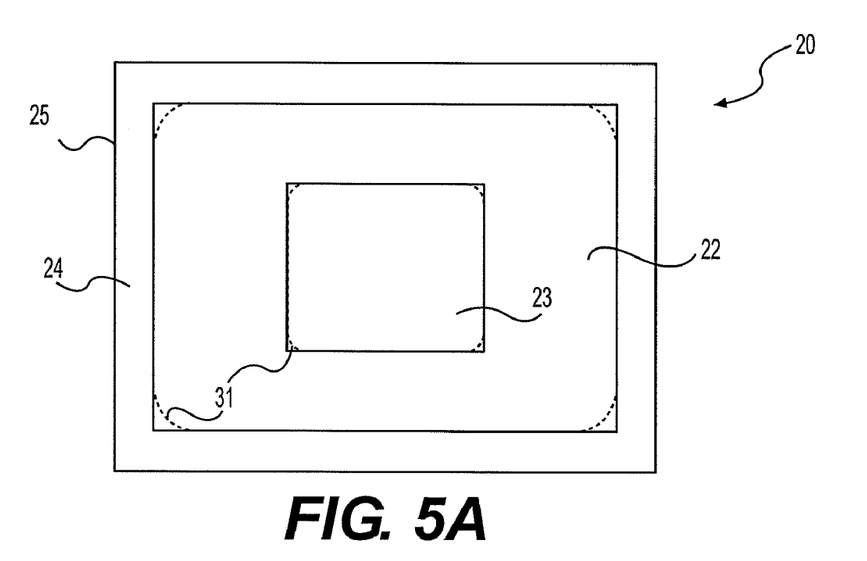
FIGS. 5A-5D are simplified views of the invented RFID tag and combination of aperture antenna with matching elements in various stages of development and from both outside (the "windshield side") and inside (the "driver side") of a vehicle, at its windshield.

Reference is now made to FIGS. 5A-5D, which illustrate various views of an exemplary RFID tag 20 of the invention. FIG. 5A is a view without matching circuit elements and RFIC, at one side of a planar passive RFID tag 20 with small aperture (here, slot) antenna element 22 having an aperture 23, at an initial stage of fabrication according to a presently preferred embodiment of the invention. In a presently preferred embodiment, the RFID tag is implemented to be ultimately of sheet sticker-type form intended to be affixed to a surface, preferably the inside surface, of a vehicle's windshield for use in a highway toll collection application. However, it will be understood that the principles of the invention are not so limited either in tag type or its application. Indeed the invention is suited for many other uses of RFID tags, active and passive, albeit particularly well suited to moderate to high speed applications.

In any event, for purposes of clarity in describing a preferred embodiment, it will be useful to refer from time to time to the sticker tag mounted (or to be mounted) on the windshield of a vehicle (again, preferably on its inside surface), as being viewed from the "windshield side," for a person standing outside the vehicle looking through the windshield at the tag; and as being viewed from the "driver side," for a person sitting inside the vehicle behind the steering wheel looking toward the windshield. Of course, these terms are arbitrary. In fact, the sticker may be transparent (at least in portions of it not occupied by components of the RFID tag of the invention) so that although some portions of the tag may be situated on one side and other portions on the opposite side of the sticker, both of those sides would be viewable whether one is looking at the sticker from the driver side or the windshield side. In other words, in that situation one would see a composite view of the components in either case. Or the sides of the sticker might be reversed relative to how it is to be mounted so the one termed the driver side in this description would be the windshield side, and vice versa, in another embodiment. Or the sticker tag might readily be used in a completely different embodiment, without any loss of the principles and advantages of the invention, so that the terms driver side and windshield side would have no meaning.

Preferably, antenna element 22 is printed on one side (the windshield side) 24 of a 0.005-inch thick polyester sheet 25. Sheet 25 is electrically insulative and a dielectric. Element 22 is a metallization layer, such as an electrically conductive plane, a thin copper sheet, plated copper, or other thin film of electrically conductive material such as a silver paste applied to the sheet 25 surface 24 with a silk screen process, or conductive ink applied to that surface. The small aperture 23 is formed as a non-conductive window in the otherwise conductive plane, e.g., by pattern etching or by a void in inking of the conductive film, to give the antenna element 22 its shape shown in FIG. 5A. The size of the small aperture antenna is smaller than a half wavelength of the designated RF wavelength for signals to be transmitted between the tag and a reader.

In particular, the shape or form of antenna 22 is preferably that of a polygon. At either extreme, the polygon may be a triangular or circular (for instance, where the polygon has numerous sides) in shape. That is, if the sides originally forming a square were increased, while remaining of equal (or even unequal) length, the shape approaches or effectively becomes a circle. A rectangle would, in the same circumstances, become an ellipse or oval. So the polygon or polygonal shape is the more general term, but in practice, a rectangular (as shown in FIGS. 5A, 5C, 5D) or square shape is preferred. Indeed, more broadly, the antenna may be of any shape suitable for a small aperture antenna, but for reasons of placement and configuration of the elements of an impedance matching circuit and a RFIC together with the antenna element on the sheet 25 to produce the final product (a RFID tag) according to the invention, a rectangle or a square appears to be most suitable, as will be observed from the ensuing description. The polygon may have rounded corners at the connection between each adjoining pair of its sides, as shown in dotted lines 31 in FIG. 5A.

Figure 5B:
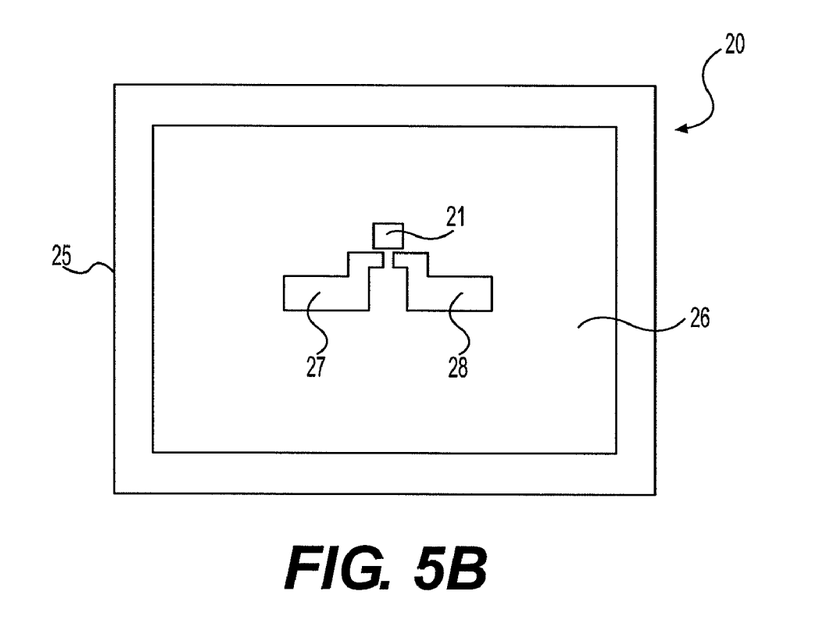
Figure 5C:
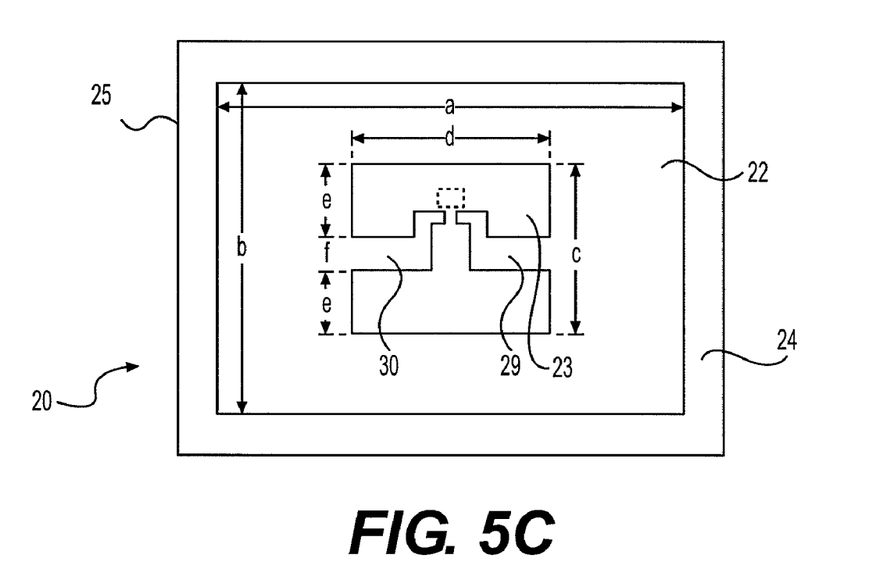
Figure 5D:
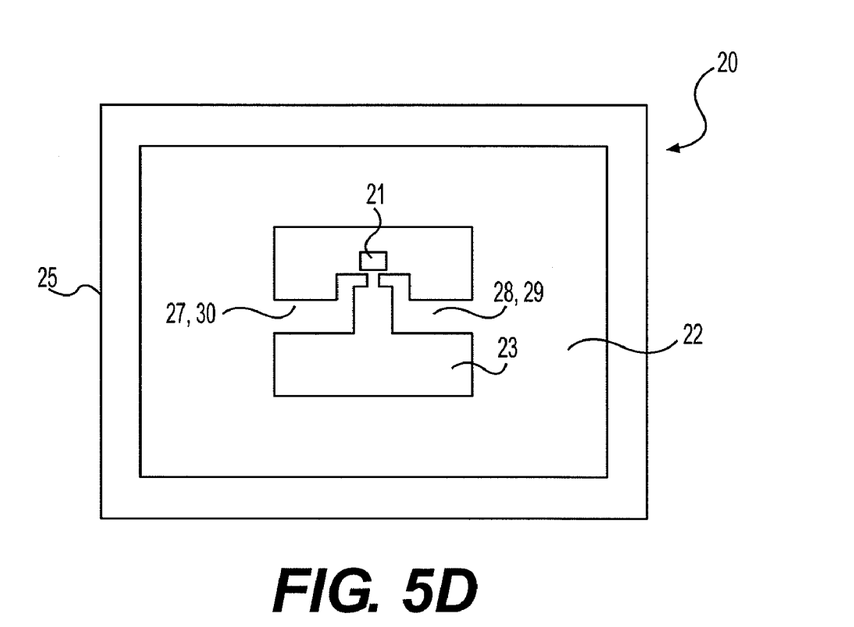

As shown in FIG. 5B, a view of the opposite side (the driver side) 26 of polyester sheet 25 on which RFID tag 20 is formed at a subsequent stage of its development, RFIC 21, a previously fabricated semiconductor microchip, for example, with conventional CMOS (complementary metal-oxide-silicon) technology, is secured to driver side 26. The mounting of the chip is substantially equidistant from a pair of opposite sides of the polygon. The RFIC 21 chip is fabricated to contain the electronic circuitry including transponder, device memory (e.g., read/write (R/W), read-only (RO), or both) and anything else required for the tag operation other than antenna element 22 and impedance matching circuitry. Placement of RFIC 21 is preferably just slightly above the center of aperture 23 (relative to the location and boundaries of the aperture on the windshield side 24 of sheet 25). Alternatively, RFIC 21 may be placed right or left of a centerline vertically through the aperture if the impedance matching elements are instead formed vertically (from top and bottom legs rather than side legs of the antenna, as viewed in FIGS. 5C and 5D).

Continuing to refer to FIG. 5B, this placement of the RFIC 21 chip is chosen to allow matching impedance circuitry elements 27, 28 to be formed (in the same manner as described above for antenna element 22) on driver side 26 for connection to appropriate exposed terminals of the circuitry integrated in the chip. The elements 27, 28 are formed on driver side 26 before the chip is attached to sheet 25 on that side, as a pair of conductive impedance matching elements of substantially equal length extending toward each other into the aperture from the opposite sides or legs of antenna element 22 from which the RFIC 21 is equidistant.

Actually, elements 27, 28 are a mirror image of impedance matching circuitry elements 30, 29 respectively, that are formed on the windshield side 24 of sheet 25 (in the view FIG. 5C), preferably before elements 27, 28 are formed on the driver side 26. Elements 29, 30 may be conveniently fabricated at the same time as antenna element 22 is formed, by appropriately etching the conductive plane or applying the pattern of conductive ink printing onto the surface of windshield side 24. Matching impedance elements 27, 28 are subsequently formed on driver side 26 directly opposite their respective counterparts (elements 30, 29) on windshield side 24 so as to be capacitively coupled thereto. The value of the capacitance is determined by the dimensions of the impedance matching sections and the thickness and dielectric constant of sheet 25. Alternatively, albeit less desirable, the matching elements on one side may be connected to their respective counterparts on the other side by a metallization of limited extent (e.g. a hole filled with copper or silver paste for each pair of the mirror images) through sheet 25.

In this way, the matching impedance circuitry is connected between the antenna feed and the RFIC, to provide matching of the impedance from the antenna and the input impedance of the RFIC in the RFID tag. The complex impedance provided by the overall impedance matching circuitry is readily determined by computer or microwave simulation before the tag is fabricated. Hence, nothing prevents forming the overall impedance matching circuitry at virtually any stage of the manufacturing process for RFID tag 20. A further advantage of the present invention, aside from the flexibility and ease of construction of the tag itself, is the fact that no separate feedline is required to the antenna as is the case with previous designs, because the impedance matching elements are directly connected (or, in part, capacitively coupled) to the antenna and the RFIC.

The final shape of aperture 23 on the windshield side 24 of the tag is shown in FIG. 5C, and the composite shape of the overall components on the tag is shown in FIG. 5D as though the sheet 25 were transparent, which it may be. A shown, the aperture 23 has a rectangular shape and is positioned at the center of the antenna element in both the horizontal and vertical directions.

In one preferred embodiment of sticker tag 20, antenna element 22 has the following dimensions: a=70.0 mm, b=58.0 mm; and aperture 23 and matching sections 27, 28 has dimensions c=30.0 mm, d=30.0 mm, e=13.0 mm, and f=4.0 mm; as shown in the windshield side view of FIG. 5C.

Another advantage of using a small aperture antenna rather than a dipole antenna or other type of antenna for the RFID tag will thus be recognized from the structure of the tag according to the invention. With a dipole configuration for a RFID tag of this sheet type, access of the antenna to the circuit ground is not readily available. It would be necessary, for example, to create a hole in the insulative sheet 25 and fill it with conductive material, or to provide some other access. In contrast, a tag with the small aperture antenna design of the invention enables the antenna to be capacitively coupled to the circuit ground at the RF operating frequencies.

The sheet 25 with the various elements of the tag thereon may be laminated with a thin film to provide a complete packaged RFID tag 20, as well as to provide a protective shield against environmental or ambient contaminating substances. Either or both sides of the lamination may contain printed information, logos, or other data.

In a high speed preferred embodiment of a thin, passive RFID tag 20, the tag is applied adhesively to the windshield of a vehicle such as an automobile for use in a highway toll collection scheme. The dimensions of the tag 20 are suitable for this application as a windshield-mounted RFID tag for RF communication with a reader mounted at a vehicle passage lane to exact and record a toll against the identified vehicle as it passes by. For purposes of adhesion to the vehicle windshield, the surface of side 25 is provided with an adhesive coating or film that may be covered with a thin, peel-off, non-sticky, cover sheet (a release liner) to be removed before applying the tag to the windshield, preferably at the interior (driver side) of the vehicle about 1 inch below the windshield mounting of the rear-view mirror (i.e., antenna side of the tag against the glass). The sticker is indicative that the vehicle has been registered (authorized, and the sticker typically issued) by a government entity for vehicular licensing and registration purposes and/or for participation in the high speed toll collection program (e.g. by an authorization number or code stored in read-only memory of the tag that uniquely identifies the vehicle on which the sticker is mounted), often for all toll roads in the state or region encompassed by that entity. It is immaterial whether the sticker is an indicia of prepayment for a specified number of passes by the vehicle, or of a debit-type system for which toll collection is billed periodically to the vehicle owner.

In this particular example of a preferred embodiment, the RFID tag is preferably passive and its memory preferably contains a read-only section, with the vehicle's registration/authorization number or code stored therein. Then, whenever this vehicle is driven through an appropriately marked, toll collection on-the-fly restricted lane of a toll roadway in the region where the authorization is applicable, a communication session between a RFID reader (FIG. 10, to be described presently) positioned in or for that lane and the passive RFID tag on the vehicle passing through results in the vehicle's authorization number being recorded for the toll collection process.

With the tag/antenna of the invention, the moderate distance between reader and tag (within the specified response range of the tag), the high sensitivity and efficiency of the tag's antenna, and the power developed in the tag from the reader's RF signal combine to provide a highly accurate and reliable capture of the vehicle's identity despite the high speed nature of the transaction and the exposure of the tag sticker to potentially adverse environmental conditions from the standpoint of visually obscuring the tag's elements.

The high sensitivity and efficiency of the tag's antenna also enable increased performance with handheld readers for use in verification and enforcement activities. For example, the small aperture antenna is likely to provide, conservatively, up to 1.0 dB better sensitivity than a dipole antenna for a given RFID ASIC, which is significant for a RFID application.

The RFIC 21 chip may include a very low power circuit connected to the output of a voltage doubler (not shown). The voltage doubler is preferably constructed of Schottky diodes and an RF capacitor and driven by capacitively connecting the circuit to a supply of RF signal (i.e., the small aperture antenna with the impedance matching circuit).

The driving point impedance of the RF supply to the tag is determined by the geometry of the small antenna aperture and impedance matching sections. The parameters may be adjusted by appropriate design to obtain the desired operating frequency and bandwidth.

The RFID tag design of the present invention is highly efficient. The improved design avoids the high ohmic losses of a dipole or other antenna structure identified above that have previously been used in RFID tags, in part by using thin, narrow antenna elements, and eliminating dielectric losses.

The wider bandwidth of the small aperture antenna design enables a single RFID tag to be used in different frequency bands dictated by countries where the tag is used or the tagged object will travel. A feature of modulated backscatter RFID tags is that the tag is frequency agile, in that the tag returns the exact same RF frequency in its response as the RF frequency of the signal transmitted by the reader. No adjustments are required for the tag to be operable with RFID readers of varying RF frequency.

Figure 6:
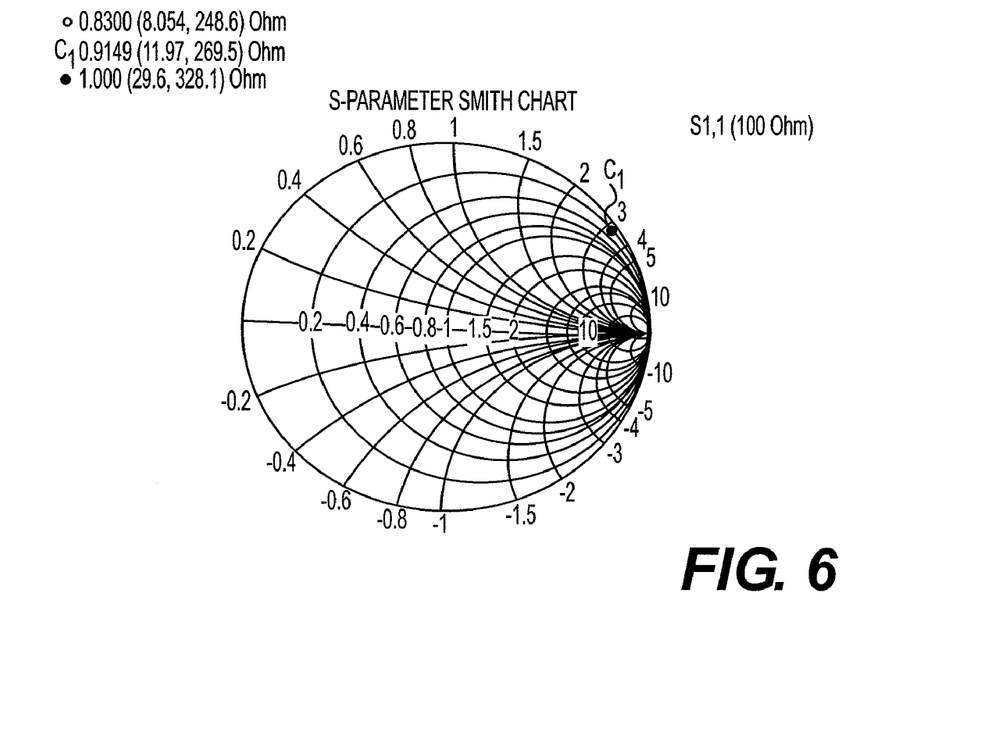
FIG. 6 is a Smith chart illustrating the typical impedance from the antenna in the RFID tag with the small aperture antenna of FIGS. 5A-5D.
Figure 7:
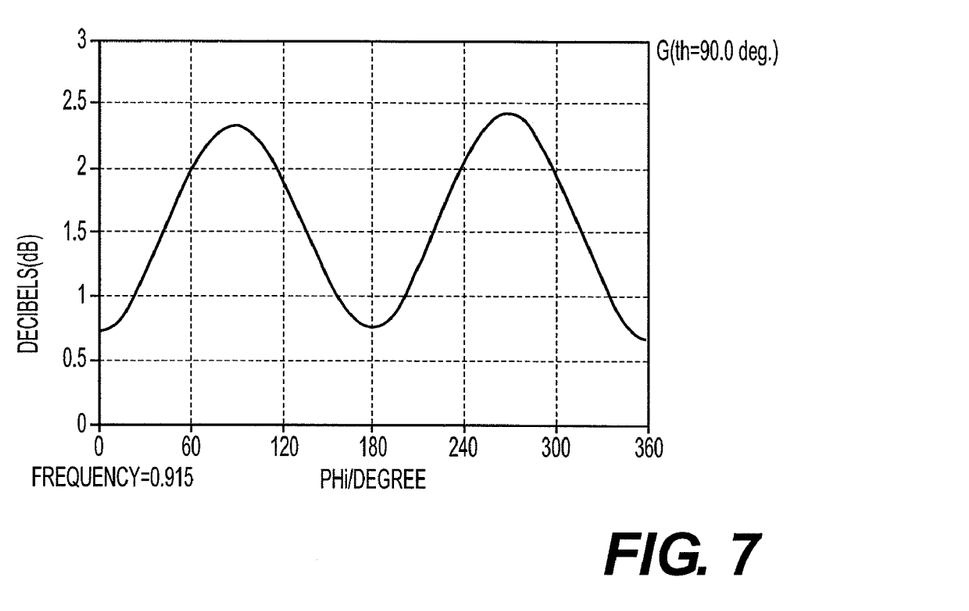
FIG. 7 is a chart showing gain at the main lobe of the small aperture antenna.

FIG. 6 is a Smith chart illustrating the typical impedance of the RFID tag small aperture antenna design of FIGS. 5A-5D. In this example, the impedance is Z=12+j270 ohms at 915 MHz. And FIG. 7 is a chart illustrating an approximately 2.3 dB gain for an antenna with the FIG. 6 Smith chart at +90 degrees, which is the main lobe broadside.

To deliver the maximum antenna signal to the RFIC 21, the impedance matching circuits 27, 28 should be designed to transform the dipole antenna impedance (Z=18−j42 ohms), and the small aperture antenna impedance (Z=12+j270 ohms) to the RFIC conjugate impedance (Z=5+j350 ohms).

Figure 8:
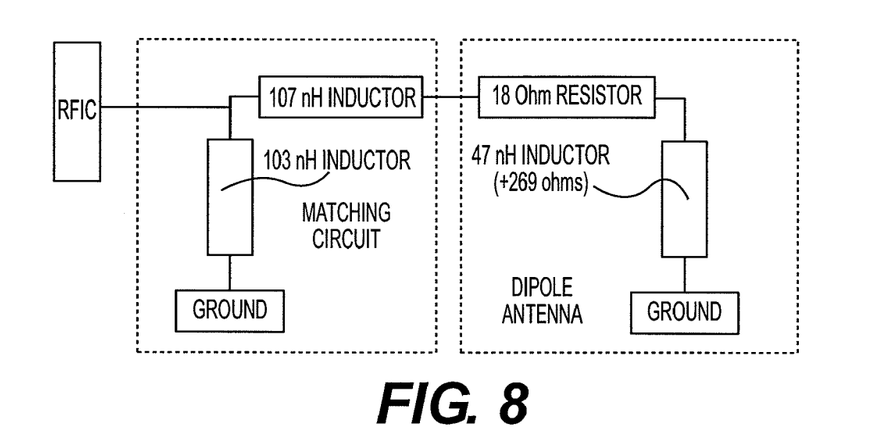
FIGS. 8 and 9 are block diagrams that exemplify the impedance matching circuit for dipole and small aperture antenna, respectively, coupled to a RFID tag's RFIC.
Figure 9:
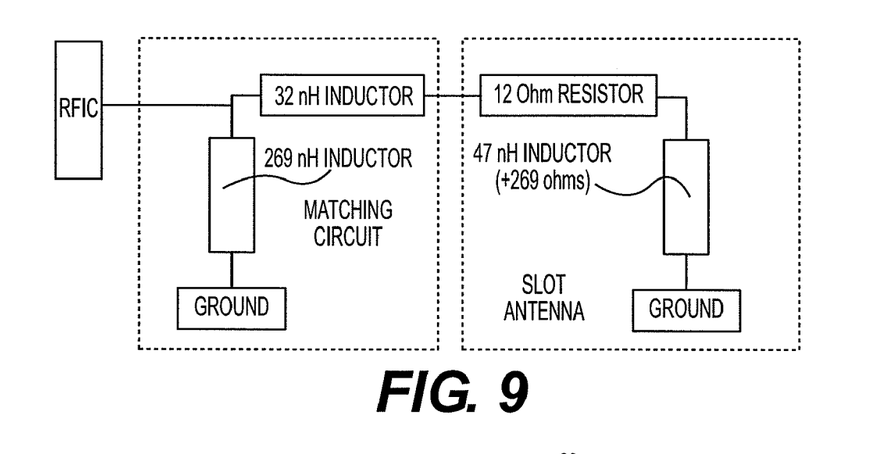

For illustrative purposes, a matching circuit is shown in FIG. 8 for a simulated dipole antenna. FIG. 9, in comparison, shows an impedance matching circuit for a small aperture antenna for a RFID tag according to the present invention. The small aperture antenna matching circuit consists of a 32 nH (nanoHenry) series inductor and a 269 nH shunt inductor, constructed as shown in FIGS. 5B-5D; whereas a dipole antenna matching circuit would consist of a 107 nH series inductor and a 103 nH shunt inductor. The larger shunt inductor is more desirable than the relatively small valued shunt inductance of the dipole antenna because the small aperture antenna shunt may be considered as an open circuit (virtually, since it is likely there would be some, albeit very tiny, current drain) and therefore not included as part of the matching circuit with less performance penalty. Meanwhile, the small series inductor is more desirable than the relatively large valued series inductance (and impedance) of the dipole antenna because of less ohmic loss and thus, greater unobstructed passage of signal from or to the antenna. A comparison of the respective series and shunt inductances and impedances of the dipole antenna and the small aperture antenna are presented in the table below:

|  | Shunt Inductor | Impedance @915 MHz | Notes | Series Inductor | Impedance @915 MHz | Notes |
| --- | --- | --- | --- | --- | --- | --- |
| Dipole Antenna | 103 nH | 591 ohms | Less desirable | 107 nH | 614 ohms | Less desirable |
| Slot Antenna | 269 nH | 1545 ohms | More desirable | 32 nH | 183 ohms | More desirable |

Accordingly, as shown by the above table, the small aperture antenna is by far the better choice between the dipole antenna, which has heretofore been the RFID tag antenna of choice, and the small aperture antenna in association with a RFID tag of the present invention, based on their relative impedances—series and shunt—as illustrated in the Table as well as their size difference. Thus, the small aperture antenna is a more practical passive RFID tag design compared to the dipole design, and additionally, offers ease of construction as shown in FIG. 5D, and higher gain as shown in FIG. 7. Among its advantages, a small aperture antenna such as a slot antenna requires considerably less current than a dipole antenna to produce the same power output from the antenna.

As noted in the Summary section above, optimum power delivery from the antenna to a load, here the RFIC, requires a conjugate match as close as is practicable at each and every frequency in a band of frequencies over which the antenna is designed to operate. The antenna aperture (gain) should not vary appreciably over the frequency band. Maximum power deliverable is equal to the product of the incident power density and antenna aperture. The load is capacitive, viz.: 5−j320=5−j Xant=5−j 1/(2 pi f C), where the symbols were defined earlier herein. As f goes up, Xant goes down. The antenna and matching impedance should compensate, so that: Zam=Ram+j Xam, where again, the symbols have been defined earlier herein. The desire is that Xam goes down as f goes up. Since the reactance of the antenna with matching impedance circuit of the present invention behaves as a capacitor, this desire is achieved, and produces a better match over a band of frequencies. The antenna gain is less influenced by frequency and nearby metallic or dielectric objects than other types of antennas.

These advantages result in the combination of the small aperture antenna with matching elements of the invention being capable of optimizing power delivery to a non-conventional, highly reactive load, including a capacitive load, over a wide frequency bandwidth. This is especially suitable for use in a RFID tag, and with a voltage doubler, but many other applications are realizable as well.

Figure 10:
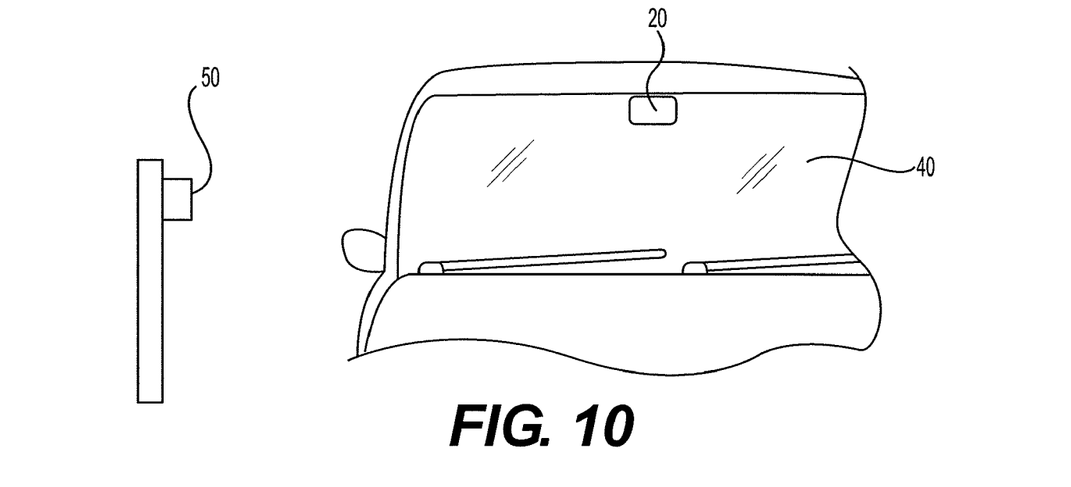
FIG. 10 is a view of a windshield mounted RFID according to the invention, in relation to a RFID reader.

FIG. 10 illustrates the preferred position of the RFID tag 20 on the windshield 40 of a vehicle, and the relative positions of the tag and a RFID reader 50 mounted adjacent to or in the vicinity of an on-the-fly toll collection lane so as to be in RF communication range of the tag as the vehicle passes through that lane. As stated earlier herein, other applications abound for a RFID tag mounted on a vehicle. Another application, for example, is where the restricted lane for vehicle passage may be a track of a railway system for asset tracking by RFID tag identification on each passage of a railcar on that track past a RFID reader. The present invention is useful for many other applications for a RFID tag of sticker construction or non-sticker flat form for use on objects including articles of commerce other than vehicles, such as for animals or personnel (including access badges and articles of clothing such as a uniform) for purposes of identification.

The foregoing description and drawings should be considered as only illustrative of the principles of the invention. The invention may be configured in a variety of ways and is not intended to be limited by the preferred embodiments or methods. For example, while the aperture antenna is preferably positioned on the RFID tag, it may instead be located in close proximity to the tag but not actually on it. The same applies to the matching elements. Although this configuration would be less desirable, it is within the intended scope of the invention. Numerous applications of the invention will readily occur to those skilled in the art from a consideration of the foregoing description. Therefore, the invention is not to be limited to the specific examples disclosed or the construction and operation shown and described. Rather, all suitable modifications and equivalents may be resorted to, within the scope of the invention as defined in the appended claims.

What is claimed is:

1. A RFID tag to be attached to an object to identify the object or a characteristic or feature thereof from data stored in the tag accessible by a RFID reader, said RFID tag comprising a relatively flat structure having a small aperture antenna positioned on or proximate the tag in the form of a polygon having electrically conductive sides, and an integrated circuit (IC) chip containing the electronics of said tag secured to said structure within the boundary of the aperture of said antenna, wherein a central open portion within said polygon constitutes the aperture of said antenna.

2. The RFID tag of claim 1, wherein said polygon is a square.

3. The RFID tag of claim 1, wherein said polygon is a circle.

4. The RFID tag of claim 1, wherein said polygon is a rectangle.

5. The RFID tag of claim 1, wherein said polygon is an ellipse.

6. The RFID tag of claim 1, wherein said polygon has rounded corners at the connection between each adjoining pair of its sides.

7. The RFID tag of claim 1, wherein said flat structure is a sticker for self-adhesion to an object.

8. The RFID tag of claim 1, wherein said tag is passive.

9. The RFID tag of claim 1, wherein said tag is active.

10. The RFID tag of claim 1, wherein said IC chip is secured within the boundary of said aperture substantially equidistant from a pair of opposite sides of said polygon.

11. The RFID tag of claim 10, including an impedance matching circuit operatively connecting said antenna to said IC chip for delivery of RF signals therebetween.

12. The RFID tag of claim 11, wherein said impedance matching circuit comprises a pair of electrically conductive elements of substantially equal length extending toward each other from said opposite sides of said polygon into said aperture for enabling electrical interaction between said antenna and said IC chip.

13. The RFID tag of claim 12, wherein a feeding point for said antenna is located between said impedance matching elements.

14. The RFID tag of claim 12, wherein said polygon comprises an electrically conductive layer of said tag and each of said pair of impedance matching elements comprises an electrically conductive strip of said layer.

15. The RFID tag of claim 14, wherein the conductive layer forming the polygon and said pair of impedance matching elements is an etched metal layer overlying an electrically insulative sheet of said flat structure.

16. The RFID tag of claim 14, wherein the conductive layer forming the polygon and said pair of impedance matching elements is conductive ink imprinted on an electrically insulative sheet of said flat structure.

17. The RFID tag of claim 12, wherein said impedance matching circuit further comprises a second pair of elements constituting a minor image of the first-named pair of elements, said first-named and second pairs of elements overlying opposite sides of an electrically insulative sheet of said flat structure, said polygon and first-named pair of elements overlying one side of said sheet and said IC chip and second pair of elements overlying the other side of said sheet.

18. The RFID tag of claim 17, wherein said first-named and second pairs of elements are electrically coupled through the capacitance formed by dielectric of said sheet.

19. The RFID tag of claim 17, wherein said first-named and second pairs of elements are electrically connected by a conductive path through said sheet.

20. The RFID tag of claim 1, wherein said flat structure and components thereof are encompassed within a coating for protection against damage from ambient environment.

21. The RFID tag according to claim 1, wherein said small aperture antenna is a slot antenna.

22. The RFID tag of claim 1, adapted to be applied wherein said object is a vehicle and said surface is the windshield of the vehicle, for RF communication of said tag with a RFID reader in the vicinity of said vehicle.

23. A radio frequency identification (RFID) tag, comprising: a flat structure with an integrated circuit (IC) chip containing electronic circuitry of said tag on a major side and a small aperture antenna in the shape of a polygon with a central aperture on the other major side, and an impedance matching circuit with elements on both sides operatively connected between said antenna and said IC chip for complex impedance matching between the two, wherein said impedance matching circuit has a shunt impedance to circuit ground sufficiently large to simulate an open circuit and a substantially smaller series impedance between said antenna and said IC chip.

24. The RFID tag according to claim 23, wherein said small aperture antenna is a slot antenna.

25. The RFID tag according to claim 23, wherein said flat structure is a sticker adapted for adhesion to an object to be identified by characteristics or features stored in the tag during RF communication with a RFID reader in stationary to high speed applications.

26. The RFID tag according to claim 25, wherein said sticker is adapted for adhesion to a vehicle.

27. The RFID tag according to claim 26, wherein said sticker is adapted for adhesion to the windshield of the vehicle, as authorization, by virtue of data stored in said tag, for participation by the vehicle in an on-the-fly roadway toll collection system in which at least one RFID reader is positioned for RF communication with said tag with respect to a toll collection lane of the roadway for automated toll collection with each passage of said vehicle through said lane.

28. The RFID tag according to claim 27, wherein said tag is adapted to transmit backscatter RF signal with elements of said stored data from said antenna in response to an interrogating RF signal incident on said antenna from said at least one RFID reader.

29. The RFID tag according to claim 23, wherein the size of said antenna is smaller than one-half wavelength of the RF communication frequency designated for operation of said tag.

30. A method of enabling a vehicle to be detected automatically as being authorized for passage through a restricted lane equipped with a RFID reader, which comprises the step of making available to the vehicle a RFID tag in the form of a planar compact sticker that incorporates a storage medium programmed with authorization data that identifies the vehicle as being permitted to pass through said lane without stopping, said sticker further including a small aperture antenna implemented as a polygon with central aperture for optimized communication of the stored authorization data from said antenna in a backscatter RF signal in response to an interrogating RF signal from said RFID reader when within RF communication range of said RFID tag, the storage medium being secured to the small aperture antenna within the boundary of the central aperture.

31. The method according to claim 30, including the step of affixing said sticker to the windshield of the vehicle.

32. The method according to claim 30, wherein said restricted lane is for vehicle passage to or from a parking facility.

33. The method according to claim 30, wherein said storage medium is programmed with authorization data that uniquely identifies the vehicle as being permitted to pass through said lane.

34. The method according to claim 33, wherein said restricted lane is for vehicle passage to or from a secure facility.

35. The method according to claim 33, wherein said restricted lane is a payment collection lane for automatic debiting of payment due with each passage of the vehicle therethrough.

36. The method according to claim 33, wherein said restricted lane is a toll collection lane for automatic on-the-fly roadway toll collection with each passage of the vehicle therethrough.

37. The method according to claim 33, wherein said restricted lane is a track of a railway system for asset tracking by RFID tag identification of each passage of a railcar on said track past said RFID reader.

38. An antenna configuration, comprising a small aperture antenna formed as a polygon having electrically conductive sides on a major surface of an electrically insulative sheet, and at least a portion of an impedance matching circuit on said surface electrically connected to said polygon for coupling said antenna to a load, for substantial impedance matching over a band of frequencies in which said antenna is designed to operate wherein said at least a portion of the impedance matching circuit comprises a pair of conductive elements projecting along said major surface in confronting spaced relation from substantially opposite sides of said polygon into a central opening of said polygon constituting the aperture of said antenna.

39. The antenna configuration of claim 38 including a second pair of conductive elements constituting a substantial minor image of the first-mentioned pair of conductive elements of the impedance matching circuit, said second pair overlying the opposite major surface of said sheet for coupling as a feed to the load when placed in or adjacent the gap formed by the confronting spaced relation of said second pair of elements.

40. The antenna configuration of claim 39, wherein said second pair of elements is capacitively coupled to the first-mentioned pair of elements of the impedance matching circuit through the dielectric of said insulative sheet.

41. The antenna configuration of claim 39, wherein the combination of said small aperture antenna and said impedance matching circuit is adapted to optimize power delivery to a load having a highly reactive impedance.

42. The antenna configuration of claim 39, wherein said load is the electronics of a RFID tag.

* * * * *